(Model.)

J. B. CORNWALL.
Cockle Screen

No. 232,242. Patented Sept. 14, 1880.

Witnesses:
Clement M. Sites
P. B. Turpin

Inventor
J. B. Cornwall
By R. S. & A. P. Lacey
Attys.

UNITED STATES PATENT OFFICE.

JOHN B. CORNWALL, OF MOLINE, ILLINOIS.

COCKLE-SCREEN.

SPECIFICATION forming part of Letters Patent No. 232,242, dated September 14, 1880.

Application filed April 30, 1880. (Model.)

*To all whom it may concern:*

Be it known that I, JOHN B. CORNWALL, a citizen of the United States, resident at Moline, in the county of Rock Island and State of Illinois, have invented certain new and useful Improvements in Cockle-Screens; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to furnish an improved cockle-screen; and it consists in the peculiar arrangement of the several parts, hereinafter fully described, and pointed out in the claims.

Figure 1:
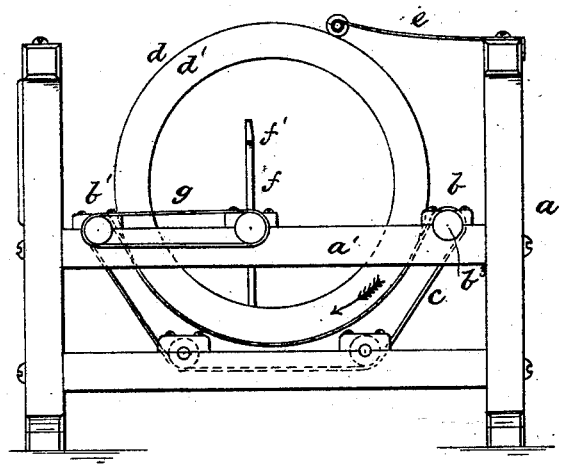
Figure 2:
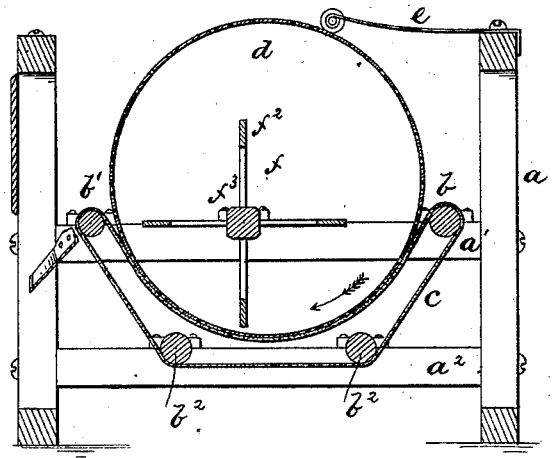
Figure 3:
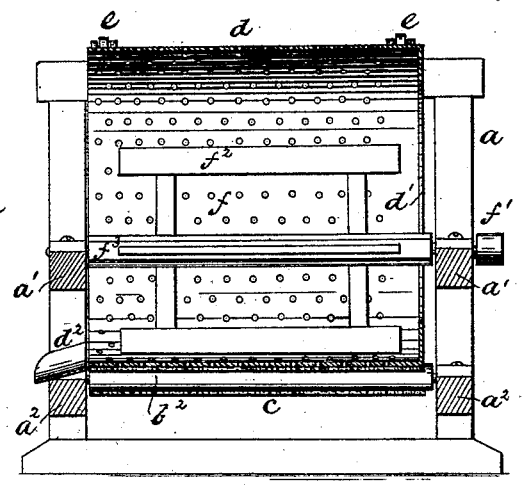

In the drawings, Figure 1 is an end elevation, Fig. 2 is a vertical cross-section, and Fig. 3 is a vertical longitudinal section, of a screen constructed according to my invention.

$a$ is the frame in which are supported the several parts of my invention.

On the end cross-beams, $a'$, and near the opposite sides of the frame $a$, I journal the longitudinal rollers $b\ b'$, which are separated a distance about equal to the diameter of the cylindrical screen hereinafter described. On the lower cross-beams, $a^2$, I journal the guide-rollers $b^2\ b^2$. Around these rollers $b$, $b'$, and $b^2$ passes the endless apron $c$, which is made of any suitable material. The upper portion of the apron sags down, as shown, and receives the cylindrical screen $d$.

The cylindrical screen $d$ is provided with holes large enough to permit the cockle to pass through, and it rests on the endless apron $c$ and between the rollers $b\ b$. It is held firmly against the apron by the bars $e$, on the ends of which are fixed friction-rollers, as shown. The bars $e$ are, by preference, made of spring metal, so that they will yield slightly to severe upward pressure. The bars $e$ have one end fixed rigidly to the upper beams of the frame $a$, while their opposite ends, in which are journaled the friction-rollers, bear downward on the upper side of the cylinder. The cylinder is not provided with a central axle, but it rests on and receives its motion from the endless apron $c$.

I place within the cylinder an agitating-wheel, $f$, which is journaled on the cross-beams $a'\ a'$, and is provided on the end of its axle with a pulley, $f'$. It is composed of one or more wings, $f^2$, fixed on the central axis, $f^3$, as shown in Figs. 2 and 3, which wing extends nearly to the screen. Over the pulley $f'$, and over a pulley on the end of the roller $b'$, I put a belt, $g$, which gives motion to the agitating-wheel.

Motion is given to the apron $c$ by a belt passed over a pulley, $b^3$, on the end of the roller $b$. The apron $c$ is moved in the direction of the arrow, Figs. 1 and 2, which causes the cylinder $d$ to revolve in the same direction. The belt $g$ causes the agitating-wheel $f$ to revolve in the opposite direction to the cylinder.

On the side of the frame I fix a spout, $h$, which receives and conveys cockle to any suitable vessel placed below it.

The cylinder $d$ is provided at its receiving end with a rim, $d'$. At the opposite end of the frame there is arranged a spout, $d^2$, which receives the cleaned grain from the cylinder and discharges it into a suitable receptacle.

In the operation of the device the grain enters through the disk or rim $d'$. The agitating-wheel $f$ keeps the grain knocked back over the surface of the screen, so that the cockle all settles into the perforations or openings before any of said grain reaches the discharge-spout $d^2$.

By having the cylinder supported by and receiving motion from the apron $c$ a more regular and steady movement is secured. There is no sliding of the cylinder in the apron, nor will the cockle ever get between the cylinder and the apron, as in ordinary cockle-separators of this class.

This machine, if employed without the central agitating-wheel, will clean cockle out of grain better than can be done by the ordinary separators, because of the regularity and uniformity of motion between the apron and cylinder. It is less expensive in its manufacture, and it presents a continuous and unbroken screening-surface.

Having thus described my invention, what

I claim, and desire to secure by Letters Patent, is—

1. In a cockle-separating machine, the cylindrical screen $d$, supported on and receiving its motion from the endless apron $c$, substantially as set forth.

2. In a cockle-screen, the combination of the screen $d$, the endless apron $c$, and the tension bars or springs $e$, arranged to operate substantially as and for the purposes stated.

3. In a cockle-separator, the combination of the endless apron $c$, the cylinder $d$, resting upon and receiving its motion from the endless apron $c$, the agitating-wheel $f$, placed within the cylinder, and belt $g$, all arranged to operate substantially as and for the purpose set forth.

In testimony that I claim the foregoing I have hereunto set my hand and seal this 20th day of April, 1880.

J. B. CORNWALL. [L. S.]

Witnesses:
    JOHN G. BEATTY,
    J. B. WHEELOCK.